United States Patent [19]

Koyama et al.

[11] Patent Number: 5,247,237
[45] Date of Patent: Sep. 21, 1993

[54] CONTROL DEVICE OF INDUCTION MOTOR

[75] Inventors: Masato Koyama, Hyogo; Akira Imanaka, Nagoya, both of Japan

[73] Assignee: Mitsubishi Denki Kabushiki Kaisha, Tokyo, Japan

[21] Appl. No.: 928,052

[22] Filed: Aug. 11, 1992

[30] Foreign Application Priority Data

Sep. 6, 1991 [JP] Japan .................. 3-254454

[51] Int. Cl.$^5$ .............................. H02P 5/40
[52] U.S. Cl. ...................... 318/808; 318/825
[58] Field of Search ............. 318/434, 782, 825, 826, 318/800, 811, 808, 805–806, 687, 802, 803, 809

[56] References Cited

U.S. PATENT DOCUMENTS

| | | | |
|---|---|---|---|
| 4,237,531 | 12/1980 | Cutler et al. | 318/805 |
| 4,381,478 | 4/1983 | Saijo et al. | 318/687 |
| 4,757,240 | 7/1988 | Mizobuchi et al. | 318/800 |
| 4,767,976 | 8/1988 | Mutoh et al. | 318/808 |
| 4,788,485 | 11/1988 | Kawagishi et al. | 318/811 |
| 4,823,066 | 4/1989 | Yoshiki et al. | 318/806 |
| 4,876,637 | 10/1989 | Mose et al. | 318/802 |

FOREIGN PATENT DOCUMENTS 63-77398 4/1988 Japan .
64-23793 1/1989 Japan .

*Primary Examiner*—William M. Shoop, Jr.
*Assistant Examiner*—John W. Cabeca
*Attorney, Agent, or Firm*—Burns, Doane, Swecker & Mathis

[57] ABSTRACT

An object of the invention is to provide a control device of an induction motor where an inverter circuit can be protected from overcurrent by stable current limitation operation not only at steady operation but also at rapid acceleration/deceleration or at regenerative braking. A current component calculation circuit calculates a first current component from primary current detected by a current detector and output frequency. A correction frequency calculation circuit calculates a frequency correction value using a current limit value and the first current component according to prescribed function calculation. A subtractor subtracts the frequency correction value from a primary frequency command value. A voltage component calculation circuit calculates a primary voltage component command value according to the subtracted output. A primary voltage command calculation circuit calculates a primary voltage command value of the induction motor from the subtracted output and the primary voltage component command value and outputs it to a voltage conversion circuit.

13 Claims, 12 Drawing Sheets

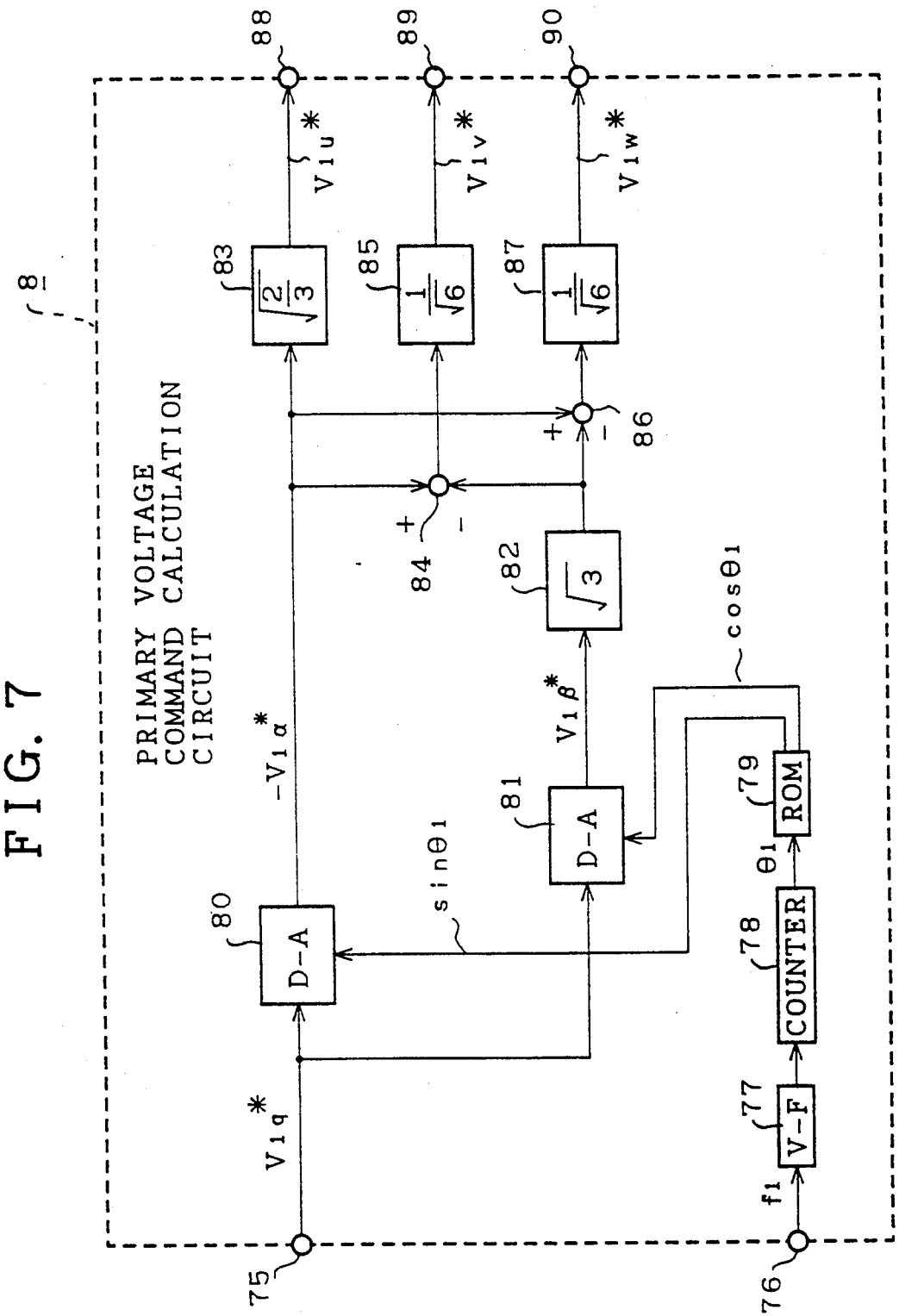

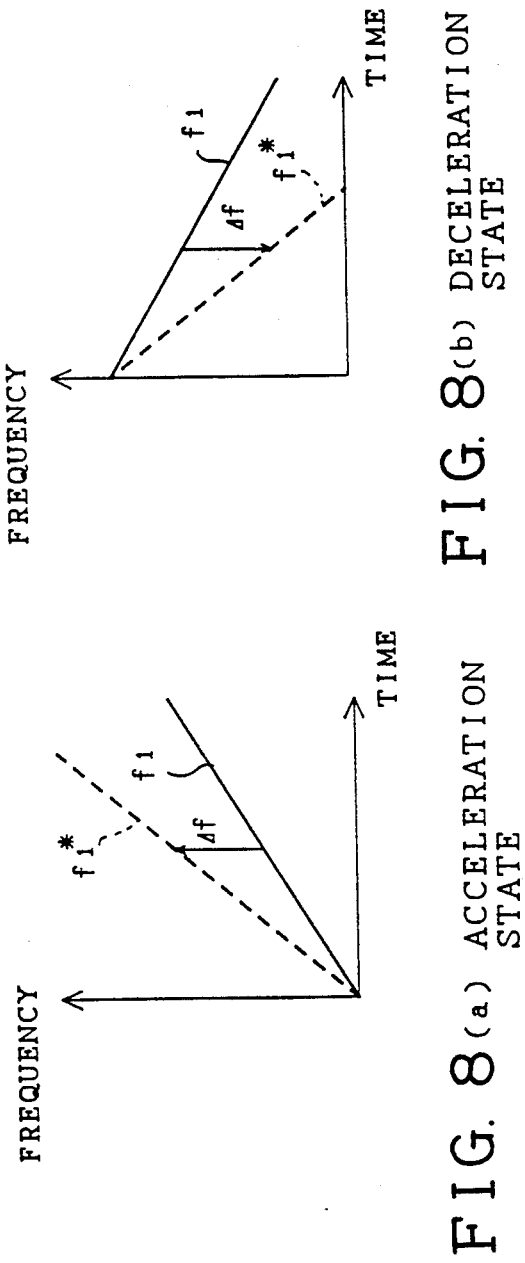

CONTROL DEVICE OF INDUCTION MOTOR

BACKGROUND OF THE INVENTION

1. Field of the Invention

The present invention relates to control device with current control function to protect an induction motor and drive devices, such as inverters, from overcurrent.

2. Description of the Prior Art

FIG. 1 shows a control device of an induction motor in the prior art, for example, disclosed in Japanese patent application laid-open No. 77398/1988. In FIG. 1, numeral 2 designates an induction motor, numerals $3u$, $3w$ designate current detectors for detecting primary current of the induction motor 2, numeral 20 designates a primary frequency command generator, numeral 22 designates a converter circuit for converting three-phase alternating current into direct current, numeral 23 designates a capacitor for smoothing direct current, numeral 24 designates an inverter circuit for converting direct current into alternating current with variable voltage and variable frequency, numeral 25 designates a gate circuit for driving a main switching element in the inverter circuit 24, and numeral 30 designates a control circuit.

The control circuit 30 comprises a microcomputer 31 for carrying out control, an amplifier circuit 32 for amplifying a switching signal outputted from the microcomputer 31 and outputting the amplified signal to the gate circuit 2, a current detecting circuit 33 for making a primary current $I_{1v}[I_{1v} = -(I_{1u}+I_{1w})]$ of residual one phase from primary currents $I_{1u}$, $I_{1w}$ of two phases and generating absolute values $I_u$, $I_v$, $I_w$ of each signal, and a sample-hold circuit 34 for holding the absolute value signals $I_u$, $I_v$, $I_w$ outputted from the current detecting circuit 33 according to sample signals $S_u$, $S_v$, $S_w$ outputted from the microcomputer 31, where the hold value is a peak value of active component of the primary current.

The control circuit 30 also comprises an effective component current detecting circuit 35, a comparator 36, an overload current setting device 37, a soft start/stop circuit 38 for generating ramp function with a previously set time corresponding to a primary frequency command value outputted from the primary frequency command generator 20, and an oscillator 39 for generating pulse train proportional to output of the soft start/stop circuit 38, where output signal B of the oscillator 39 determines output frequency of the inverter circuit 24 and output A of the soft start/stop circuit 38 determines output voltage of the inverter circuit 24.

Next, based on FIG. 2, principle will be explained regarding that specific time point of primary current is sampled thereby active component of the primary current can be detected. In FIG. 2, $V_{1u}$ is primary voltage in u-phase, and $I_{up}$, $I_{uq}$ are effective component and reactive component of primary current $I_{1u}$ in u-phase respectively. $\phi$ is power factor angle.

In the steady state, equation (1) applies.

$$
\begin{aligned}
I_{1u} &= I_1 \sin(\omega t - \phi) \\
&= I_{up} + I_{uq} \\
&= I_1 \cos\phi \sin\omega_1 t + I_1 \sin\phi \sin(\omega_1 t - \pi/2)
\end{aligned} \quad (1)
$$

where $V_{1u} = V_1 \sin\omega_1 t$.

That is, the effective component $I_{up}$ of the primary current $I_{1u}$ is in the same phase as that of the primary voltage $V_{1u}$, and the reactive component $I_{up}$ has phase lagging by 90 degrees with respect to the primary voltage $V_{1u}$. Accordingly, it is seen that if absolute value signal of $I_{1u}$ is sampled at the time points of 90 degrees and 270 degrees with respect to the phase of $V_{1u}$, peak value of absolute value of the effective component $I_{up}$ can be detected.

Also since the primary voltage $V_{1v}$ in v-phase has phase lagging by 120 degrees with respect to $V_{1u}$, if absolute value signal of $I_{1v}$ is sampled at the time points of 30 degrees and 210 degrees with respect to the phase of $V_{1u}$, peak value of absolute value of the effective component $I_{vp}$ can be detected, and since the primary voltage $V_{1w}$ in w-phase has phase leading by 120 degrees with respect to $V_{1u}$, if absolute value signal of $I_{1w}$ is sampled at the time points of 10 degrees and 330 degrees with respect to the phase of $V_{1u}$, peak value of absolute value of the effective component $I_{wp}$ can be detected.

Next, operation of the prior art will be described.

The microcomputer 31 inputs output signal a of the soft start/stop circuit 38 and output signal b of the oscillator 39, and calculates command values $V_{1u}^*$, $V_{1v}^*$, $V_{1w}^*$ of primary voltages to be outputted by the inverter circuit 24, and forms and outputs switching signals based on the command values. Then according to the detection principle as above described, sample signals $S_u$, $S_v$, $S_w$ are outputted to detect peak values of absolute values of effective components of primary currents with respect to the phase of $V_{1u}^*$.

Next, the sample-hold circuit 34 holds absolute values of primary currents outputted from the current detecting circuit 33 synchronizing with the sample signals $S_u$, $S_v$, $S_w$. Subsequently, the peak value of the absolute value of the effective current outputted through the effective current detecting circuit 35 is compared with the overload current set value by the comparator 36. As a result, if the peak value of the absolute value of the effective current is larger, control signal to reduce time variation rate of ramp function outputted from the soft start/stop circuit 38 only at the power running is outputted to the soft start/stop circuit 38.

Then, variation of amplitude and frequency of the command values $V_{1u}^*$, $V_{1v}^*$, $V_{1w}^*$ of the primary voltages calculated in the inside of the microcomputer 31 becomes gentle, and as a result, increase of the peak value of the absolute value of the effective current is suppressed.

A control device of an induction motor in the prior art as above described is constituted in that peak value of absolute value of effective component of the primary current is detected, and time variation rate of ramp function outputted from the soft start/stop circuit 38 is reduced so that the peak value does not exceed the previously set limit value.

At the steady state where power factor angle does not vary, the effective component of the primary current can be detected exactly, but at the transient state where power factor angle varies during one period of the primary voltage, as it cannot be detected exactly, current limitation is difficult in the case that the induction motor is accelerated rapidly.

Also in the control device of the induction motor in the prior art, since current limitation is effected only at the power running state, during regenerative period until stopping the induction motor in rotating state, the current limitation cannot be effected if any measure is not done.

Further, in order to protect the inverter circuit 24 from overcurrent, the peak value of the primary current must be limited, but if reactive component is included much in the primary current, limitation of the peak value of the primary current is difficult only by limiting the peak value of the effective component.

SUMMARY OF THE INVENTION

In order to solve the above-mentioned problems in the prior art, an object of the present invention is to provide a control device of an induction motor where an inverter circuit can be protected from overcurrent by stable current limitation operation not only at the steady operation but also at rapid speed acceleration/deceleration or at regenerative braking.

A control device of an induction motor according to the invention comprises:

1) a current component calculation circuit calculating a first current component from primary current of the induction motor;

2) a correction frequency calculation circuit for calculating a frequency correction value from a previously set current value and the first current component;

3) a subtractor for subtracting the frequency correction value from a primary command value;

4) a voltage component command calculation circuit for calculating a primary voltage component command value based on output of the subtractor, i.e., output frequency;

5) a primary voltage command calculation circuit for calculating a primary voltage command value based on output of the subtractor and the primary voltage component command value; and 6) a power conversion circuit for inputting the primary voltage command value and controlling primary voltage of the induction motor.

Also a control device of an induction motor in other mode according to the invention comprises:

1) a current component calculation circuit for calculating first and second current components from primary current of the induction motor;

2) a correction frequency calculation circuit for calculating a frequency correction value from a previously set current value and the first and second current components;

3) a subtractor for subtracting the frequency correction value from a primary frequency command value;

4) a voltage component command calculation circuit for calculating a primary voltage component command value based on output of the subtractor, i.e., output frequency;

5) a primary voltage command calculation circuit for calculating a primary voltage command value based on output of the subtractor and the primary voltage component command value; and 6) a power conversion circuit for inputting the primary voltage command value and controlling primary voltage of the induction motor.

A current component calculation circuit in first mode of the invention outputs a first current component with the same phase as that of a primary voltage component command value. Subsequently a correction frequency calculation circuit calculates a frequency correction value from a current set value and the first current component according to prescribed function calculation.

Also the frequency correction value is subtracted from a primary frequency command value inputted from the outside by the subtractor, and is inputted as output frequency to a voltage component command calculation circuit. Subsequently the voltage component command calculation circuit calculates a primary voltage component command value according to function relation previously set.

Further a primary voltage command calculation circuit calculates a command value of primary voltage to be applied to the induction motor from output of the subtractor and the primary voltage component command value, and outputs it to a power conversion circuit. Then the power conversion circuit performs control so that an actual value of primary voltage applied to the induction motor follows the primary voltage command value.

In this case, the first correction frequency calculation circuit outputs a frequency correction value to correct the primary frequency command value according to prescribed function calculation, not depending on the power running and regenerative braking state, so that the first current component does not exceed the current set value.

A current component calculation circuit in second mode of the invention outputs a first current component with the same phase as that of a primary voltage component command value and a second current component with phase shifted by 90 degrees therefrom respectively. Subsequently a correction frequency calculation circuit calculates a value of root of square sum of the first and second current components, that is, an amplitude value of the primary current. Then a frequency correction value to correct a primary frequency command value is outputted according to prescribed function calculation so that the value of root does not exceed the current set value.

BRIEF DESCRIPTION OF THE DRAWINGS

FIG. 7 is a block diagram showing constitution of a primary voltage command calculation circuit in FIG. 3;

FIGS. 8(a) and 8(b) are explanatory diagrams explaining correction principle of primary frequency;

DETAILED DESCRIPTION OF THE PREFERRED EMBODIMENTS

First, constitution of a control device in the first embodiment will be described referring to FIGS. 3-7.

Figure 3:
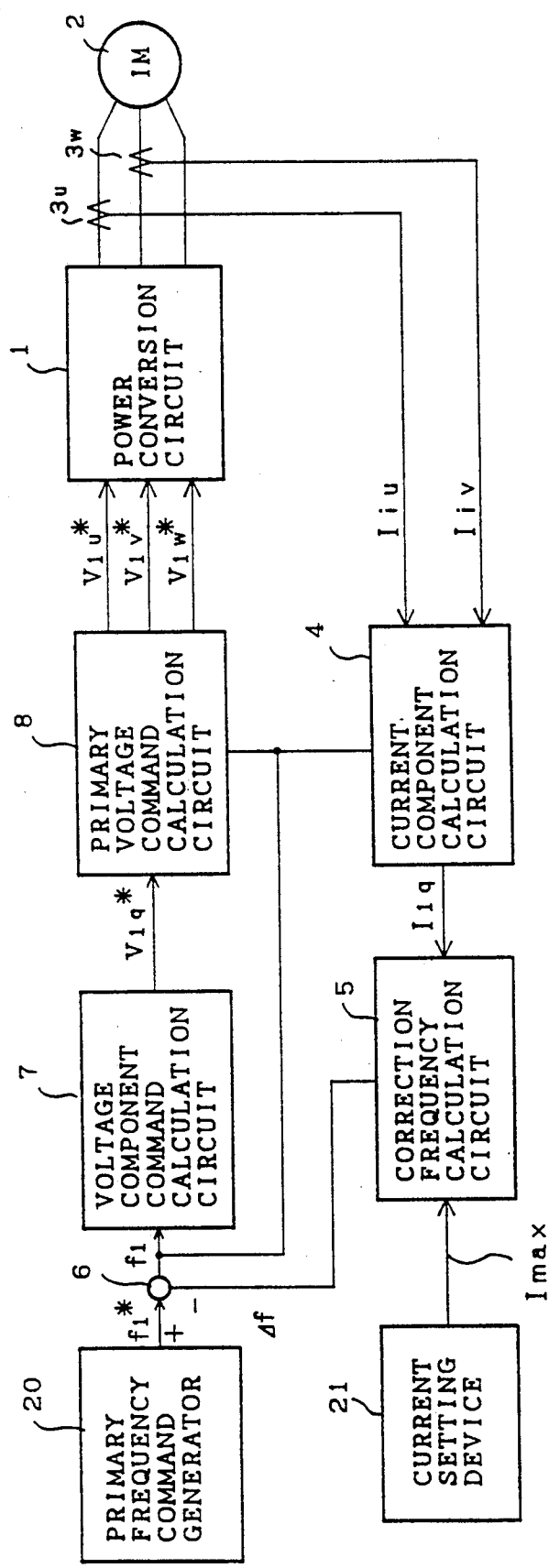
FIG. 3 is a block diagram showing a control device in a first embodiment of the invention.

FIG. 3 is a block diagram showing a control device as a whole according to the first embodiment. In FIG. 3, numeral 1 designates a power conversion circuit installed at the front stage of an induction motor 2 for outputting alternating current with variable voltage and variable frequency, and the power conversion circuit 1 is constituted, for example, by an inverter circuit 24 and its PWM circuit (not shown) in the prior art. Numeral 4 designates a current component calculation circuit for calculating a first current component based on output frequency and primary current supplied to the induction motor 2, numeral 21 designates a current setting device, and numeral 5 designates a correction frequency calculation circuit connected to the current component calculation circuit 4 and the current setting device 21 for calculating a frequency correction value.

The control device also comprises a subtractor 6 for subtracting the frequency correction value by the correction frequency calculation circuit 5 from a primary frequency command value outputted from a primary frequency command generator 20 and for outputting output frequency, a voltage component command calculation circuit 7 connected to the subtractor 6 for calculating a primary voltage component command value based on the output frequency, and a primary voltage command calculation circuit 8 connected to the subtractor 6 and the voltage component command calculation circuit 7 for calculating a command value of primary voltage to be applied to the induction motor 2 based on the output voltage and the primary voltage component command value.

Figure 4:
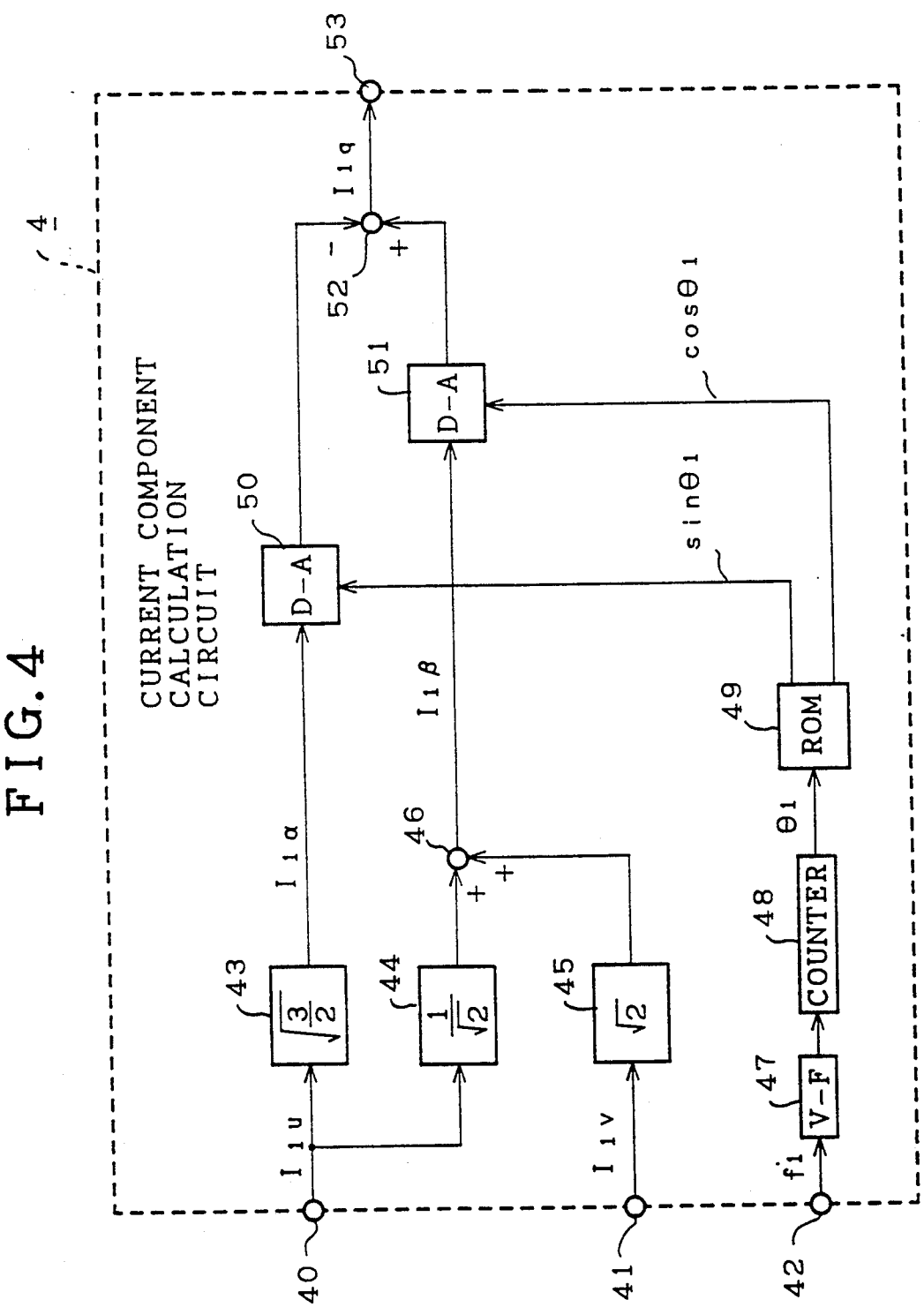
FIG. 4 is a block diagram showing constitution of a current component calculation circuit in FIG. 3.

Also FIG. 4 is a block diagram showing detailed constitution of a current component calculation circuit 4. As shown in FIG. 4, the current component calculation circuit 4 comprises input terminals 40, 41 connected to current detectors 3u, 3w, an input terminal 42 connected to the subtractor 6, scalers 43-45, an adder 46, a V-F converter 47, a counter 48, a ROM 49, multiplication type D-A converters 50, 51, a subtractor 52, and an output terminal 3 connected to the subtractor 52.

Figure 5:
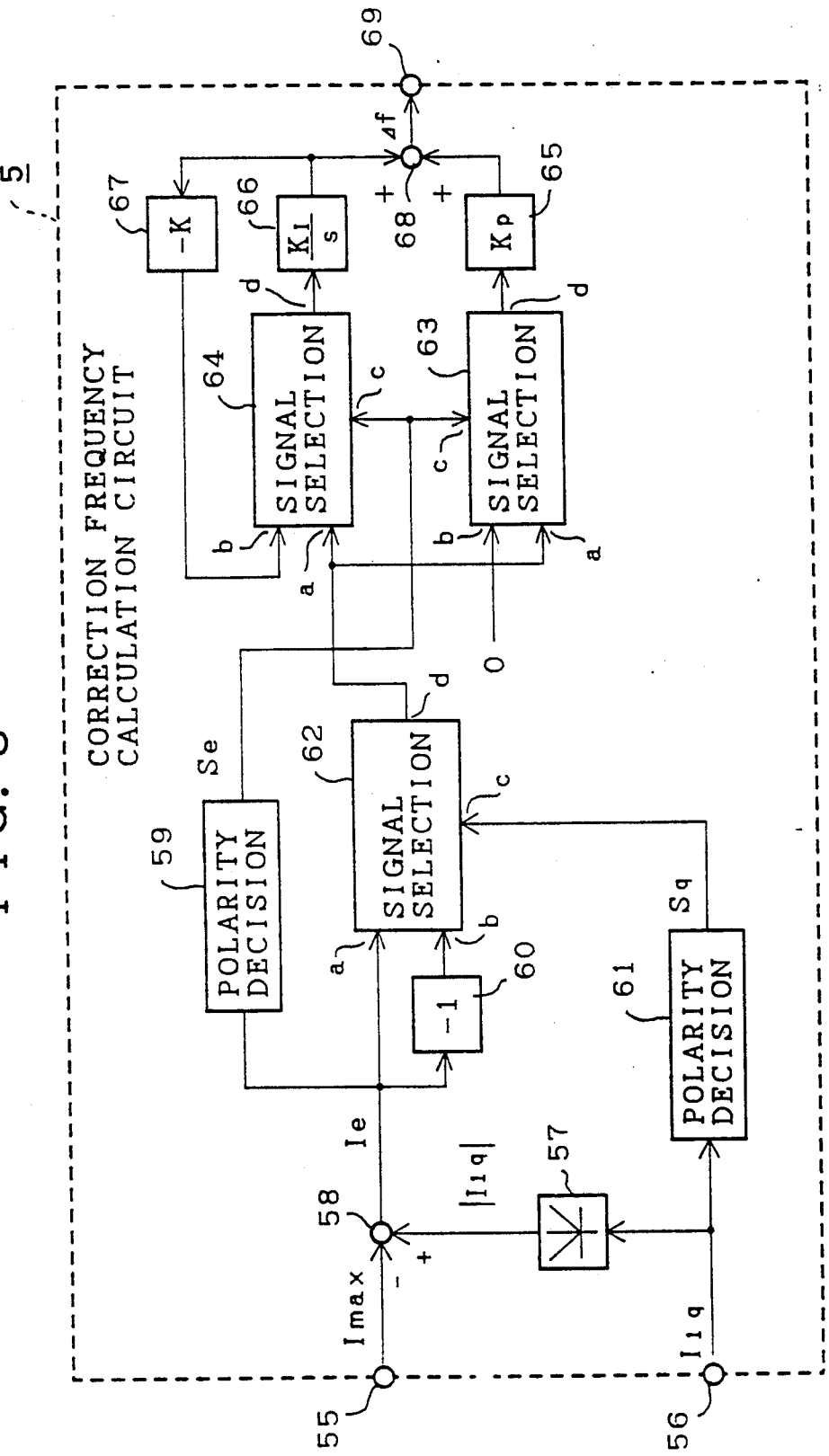
FIG. 5 is a block diagram showing constitution of a correction frequency calculation circuit in FIG. 3.

Also FIG. 5 is a block diagram showing detailed constitution of a correction frequency calculation circuit 5. As shown in FIG. 5, the correction frequency calculation circuit 5 comprises an input terminal 55 connected to the current setting device 21, an input terminal 56 connected to the current component calculation circuit 4, an absolute value circuit 57, a subtractor 58, polarity decision circuits 59, 61 scalers 60, 67, signal selection circuit 62-64, an amplifier 65, an integrator 66, an adder 68, and an output terminal 69 connected to the adder 68.

Figure 1:
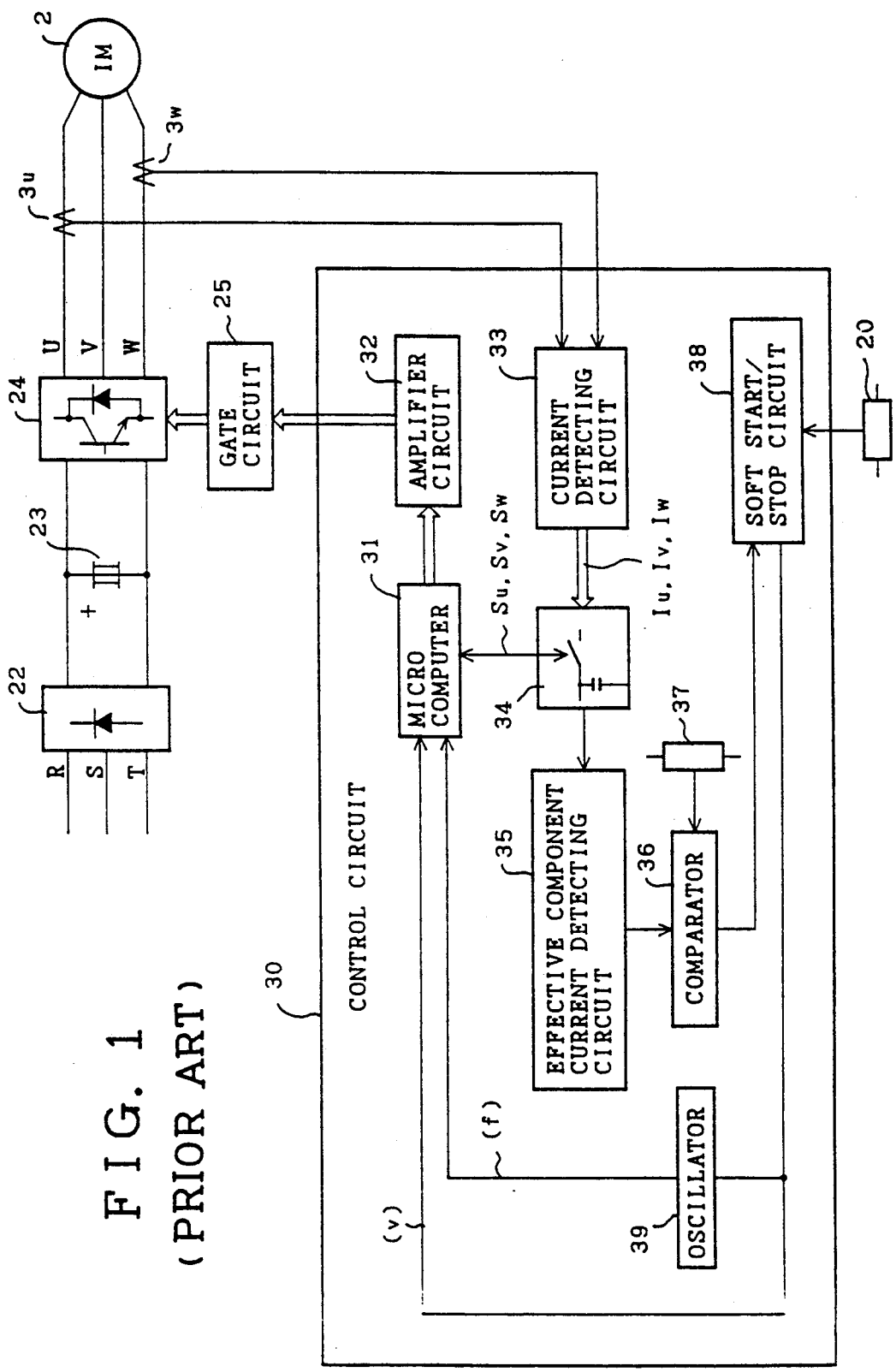
FIG. 1 is a block diagram showing a control device in the prior art.
Figure 2:
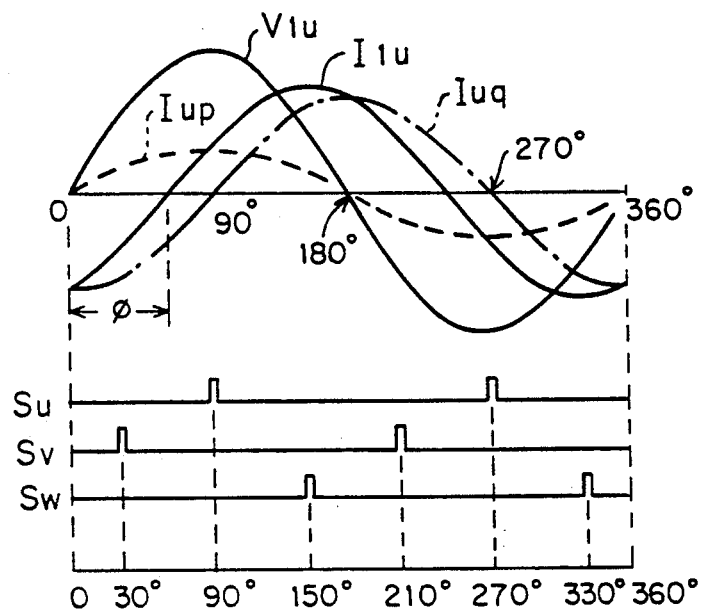
FIG. 2 is an explanation diagram explaining detection principle of effective component of primary current in a control device in the prior art.
Figure 6:
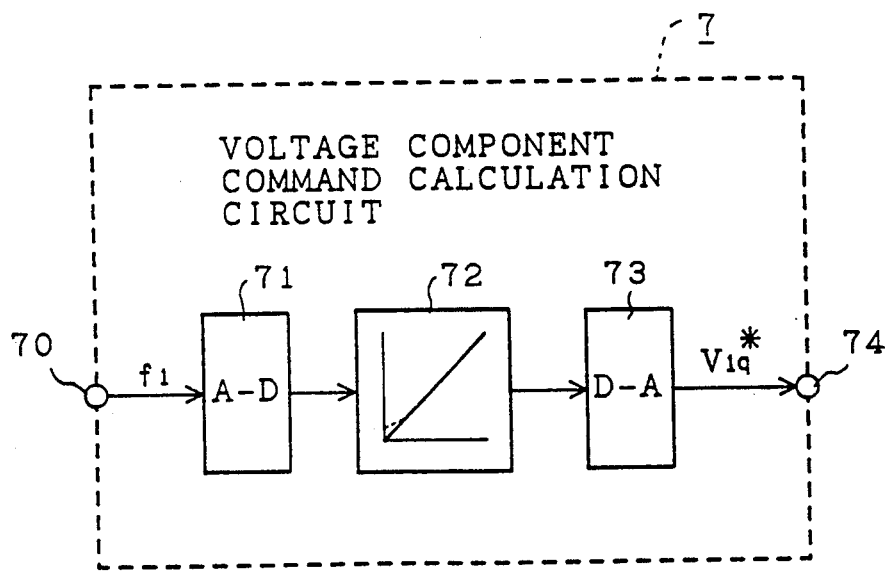
FIG. 6 is a block diagram showing constitution of a voltage component command calculation circuit in FIG. 3.

Also FIG. 6 is a block diagram showing detailed constitution of a voltage component command calculation circuit 7. As shown in FIG. 6, the voltage component command calculation circuit 7 comprises an input terminal 70 connected to the subtractor 6, an A-D converter 71, a ROM 72, a D-A converter 73, and an output terminal 74 connected to the D-A converter 73.

Further FIG. 7 is a block diagram showing detailed constitution of a primary voltage command calculation circuit 8. As shown in FIG. 7, the primary voltage command calculation circuit 8 comprises an input terminal 75 connected to the voltage component command calculation circuit 7, an input terminal 76 connected to the subtractor 6, a V-F converter 77, a counter 78, a ROM 79, multiplication type D-A converters 80, 81, scalers 82, 83, 85, 87, subtractors 84, 86, an output terminal 88 connected to the scaler 83, an output terminal 89 connected to the scaler 85, and an output terminal 90 connected to the scaler 87.

Before transferring to description of operation of the first embodiment, current calculation system in the present invention will be described. As known well, primary currents $I_{1u}$, $I_{1v}$, $I_{1w}$ supplied to the induction motor 1 can be transformed into components $I_{1\alpha}$, $I_{1\beta}$ on the orthogonal coordinate axes (made $\alpha$-$\beta$ coordinate axes) using relation in equation (2).

$$I_{1\alpha} = \sqrt{3/2}\, I_{1u} \tag{2}$$

$$I_{1\beta} = (1/\sqrt{2})\, I_{1u} + \sqrt{2}\, I_{1v}$$

Further, it is known well that the current components $I_{1\alpha}$, $I_{1\beta}$ on the $\alpha$-$\beta$ coordinate axes can be transformed into components $I_{1d}$, $I_{1q}$ on rotational coordinate axes (made d-q coordinate axes) rotating with output frequency $f_1$ using relation in equation (3).

$$I_{1d} = I_{1\alpha} \cos\theta_1 + I_{1\beta} \sin\theta_1 \tag{3}$$

$$I_{1q} = -I_{1\alpha} \sin\theta_1 + I_{1\beta} \cos\theta_1$$

where $\theta_1 = \int (2\pi f_1)dt$.

On the other hand, similar relation applies also regarding voltage, and when relation to determine primary voltages $V_{1u}$, $V_{1v}$, $V_{1w}$ from voltage components $V_{1\alpha}$, $V_{1\beta}$ on the $\alpha$-$\beta$ coordinate axes is derived utilizing equation (2), equation (4) can be obtained.

$$V_{1u} = \sqrt{3/2}\, V_{1\alpha} \tag{4}$$

$$V_{1v} = -(1/\sqrt{6})(V_{1\alpha} - \sqrt{3}\, V_{1\beta})$$

$$V_{1w} = -(V_{1u} + V_{1v})$$

$$= -(1/\sqrt{6})(V_{1\alpha} + \sqrt{3}\, V_{1\beta})$$

Also when relation to determine voltage components $V_{1\alpha}$, $V_{1\beta}$ on the $\alpha$-$\beta$ coordinate axes from voltage components $V_{1d}$, $V_{1q}$ on the d-q coordinate axes is derived utilizing equation (3), equation (5) can be obtained.

$$V_{1\alpha} = V_{1d}\cos\theta_1 - V_{1q}\sin\theta_1 \tag{5}$$

$$V_{1\beta} = V_{1d}\sin\theta_1 + V_{1q}\cos\theta_1$$

Accordingly, if a primary voltage component command value outputted from the voltage component command calculation circuit 7 is made voltage component command value $V_{1q}^*$ on q-axis, q-axis component $I_{1q}$ of the primary current becomes a current component with the same phase as that of the primary voltage component command value, that is, a first current component. Also as d-axis component and q-axis component are shifted by 90 degrees in the phase, the d-axis component $I_{1d}$ of the primary current becomes a current component shifted from the primary voltage component command value by 90 degrees in the phase, that is, a second current component.

Here, it is seen that the d-axis component $I_{1d}$ and the q-axis component $I_{1q}$ of the primary current can be calculated from the primary currents $I_{1u}$, $I_{1v}$ and the output frequency $f_1$ using equations (2) and (3).

Next, operation of the control device according to the first embodiment will be described referring to FIGS. 4–7.

As shown in FIG. 4, the first current component, i.e., the q-axis component $I_{1q}$ of the primary current is outputted by the subtractor 2. That is, if the primary currents $I_{1u}$, $I_{1v}$ are inputted from the current detector 3 through the input terminals 40 and 41 respectively, calculation of equation (2) is carried out by the scalers 43–45 and the adder 46, and the α-axis and β-axis components $I_{1\alpha}$ and $I_{1\beta}$ of the primary current are outputted from the scaler 43 and the adder 46 respectively.

On the other hand, if the output frequency $f_1$ in analog quantity outputted from the subtractor 6 is inputted through the input terminal 42 to the V-F converter 47, a signal in pulse train with frequency proportional to the output frequency $f_1$ can be obtained, and angle $\theta_1$ in digital quantity being a time integral value of the output frequency $f_1$ is calculated by the counter 48 and inputted as address of the ROM 49 where value of $\sin\theta_1$ and $\cos\theta_1$ are stored. Then digital quantity of $\sin\theta_1$ and $\cos\theta_1$ is outputted from the ROM 49.

Subsequently, if the α-axis and β-axis components $I_{1\alpha}$ and $I_{1\beta}$ of the primary current outputted from the scaler 43 and the adder 46 and the digital quantity of $\sin\theta_1$ and $\cos\theta_1$ outputted from the ROM 49 are inputted to the multiplication type D-A converters 50, 51 and multiplied and subjected to the analog conversion and then inputted to the subtractor 52, calculation by equation (3) is carried out and the first current component $I_{1q}$ is calculated and outputted from the output terminal 53.

Next, principle of polarity determination of the frequency correction value $\Delta f$ in the correction frequency calculation circuit 5 shown in FIG. 5 will be explained referring to FIGS. 8(a) and 8(b). It is known that generation of overcurrent trip due to increase of peak value of the primary current is liable to occur when time variation of the primary frequency command value $f_1^*$ is abrupt. In such a case, in order to decrease the peak value of the primary current and to prevent the overcurrent trip, the time variation of amplitude and frequency of the primary voltage applied to the induction motor 1 must be made gentle. That is, at the V/F constant control state as hereinafter described, the time variation of the output frequency $f_1$ must be made gentle.

As shown in FIG. 8(a), in order that the time variation of the output frequency $f_1$ is made gentle at the acceleration state, since frequency as a result of subtracting the correction frequency $\Delta f$ from the primary frequency command value $f_1^*$ by the subtractor 6 becomes output frequency, the polarity of the frequency correction value $\Delta f$ must be positive. On the contrary, at the deceleration state, as shown in FIG. 8(b), the polarity of the frequency correction value $\Delta f$ must be negative.

During the acceleration, since energy is supplied from the power conversion circuit 1 to the induction motor 2, the induction motor 2 becomes the power running state. On the other hand, during the deceleration, since energy is regenerated from the induction motor 2 to the power conversion circuit 1, the induction motor 2 becomes the regenerative braking state. Consequently, in order to determine the polarity of the frequency correction value $\Delta f$, decision is necessary regarding whether the induction motor is at the power running state or the regenerative braking state. If power supplied from the power conversion circuit 1 to the induction motor 2 is noticed, the power P can be expressed using voltage and current components on the d-q coordinate axes of the induction motor 2 as in equation (6) as known well.

$$P = V_{1d}I_{1d} + V_{1q}I_{1q} \qquad (6)$$

In the present invention, since control is effected so that $V_{1d}=0$, $V_{1q}=V_{1q}^*$, equation (7) can be obtained.

$$P = V_{1q}^* I_{1q}$$

In equation (7), since the polarity of $V_{1q}^*$ is known, it is seen that the polarity of $I_{1q}$ is detected thereby the decision can be effected regarding whether the induction motor is at the power running state or the regenerative braking state.

Since method of determining the polarity of the frequency correction value $\Delta f$ becomes clear as above described, the operation description will be continued. As shown in FIG. 5, the frequency correction value $\Delta f$ is outputted by the adder 68. That is, the limit value $I_{max}$ with the positive polarity outputted from the current setting device 21 through the input terminal 55 and the first current component $I_{1q}$ outputted from the current component calculation circuit 4 through the input terminal 6 are inputted to the absolute value circuit 57, and the deviation $I_e$ with the absolute value $|I_{1q}|$ of $I_{1q}$ $(=|I_{1q}|-I_{max})$ obtained is outputted from the subtractor 58. Subsequently, the polarity signal $S_e$ of the deviation $I_e$ and the sign inversion signal $-I_e$ are outputted by the polarity decision circuit 9 and the scaler 60 respectively. Also the polarity signal $S_q$ of $I_{1q}$ is outputted from the polarity decision circuit 61. Here, the polarity signal is a signal of dual value having level of Low or High.

Next, each of the signal selection circuits 62–64 is a circuit where if the polarity signal is inputted to the input terminal c, a signal inputted to the input terminal a is outputted from the output terminal d when value of the polarity signal is High, and a signal inputted to the input terminal b is outputted from the output terminal d when value of the polarity signal is Low. If the $I_e$ signal and the $-I_e$ signal are inputted respectively to the input terminals a and b of the signal selection circuit 62 and the $S_q$ signal is inputted to the input terminal c, the $I_e$ signal is outputted from the output terminal d when the polarity of $I_{1q}$ is positive, that is, when value of the $S_q$ signal is High, and the $-I_e$ signal is outputted from the output terminal d when the polarity of $I_{1q}$ is negative, that is, when value of the $S_q$ signal is Low.

Subsequently, if output of the signal selection circuit 62 is inputted to the input terminal a of the signal selection circuit 63 and a signal with zero value and the polarity signal $S_e$ of $I_e$ are inputted to other input terminals b and c respectively, output of the signal selection circuit 62 or zero is outputted from the output terminal d corresponding to the polarity of the $I_e$ signal. Further, if output of the signal selection circuit 62 is inputted to the input terminal a of the signal selection circuit 64 and output of the scaler 67 and the polarity signal $S_e$ of $I_e$ are inputted to other input terminals b and c respectively, output of the signal selection circuit 62 or output of the scaler 67 is outputted from the output terminal 64d corresponding to the polarity of the $I_e$ signal.

Subsequently, if outputs of these signal selection circuits 63 and 64 are inputted respectively to the amplifier 6 and the integrator 66 and amplified or integrated, and then outputs of these amplifier 65 and the integrator 66 are added by the adder 68, the frequency correction value $\Delta f$ is calculated and outputted from the output terminal 69. Also the output of the integrator 66 is inputted to the scaler 67 having negative coefficient value $(-K)$.

Operation of the correction frequency calculation circuit 5 shown in FIG. 5 will be specifically described regarding the power running state and the regenerative braking state respectively as follows.

First, at the power running forward rotation acceleration state, if the absolute value $|I_{1q}|$ of $I_{1q}$ exceeds the limit value $I_{max}$, the deviation signal $I_e (=|I_{1q}|-I_{max})$ with the positive polarity is outputted from the subtractor 58. On the other hand, since the polarity of $I_{1q}$ also becomes positive, the $I_e$ signal is outputted from the signal selection circuit 62.

Further since the polarity of the $I_e$ signal is positive, outputs of both signal selection circuits 63, 64 are coincident with the $I_e$ signal. The $I_e$ signal is subjected to proportional integral calculation by the amplifier 65 and the integrator 66, and the frequency correction value $\Delta f$ obtained in the calculation is outputted from the adder 68. In this case, since the polarity of the $I_e$ signal is positive, the polarity of $\Delta f$ also becomes positive, and as seen from FIG. 8(a), variation of the output frequency $f_1(=f_1^*-\Delta f)$ becomes gentle to the primary frequency command value $f_1^*$. As a result, the increase of $I_{1q}$ is suppressed.

Next, if $I_{1q}$ decreases and the polarity of the $I_e$ signal becomes negative, output of the signal selection circuit 63 becomes zero and output of the amplifier 65 also becomes zero. On the other hand, since output of the signal selection circuit 64 becomes output of the scaler 67, the frequency correction value stored in the integrator 66 decreases with the time constant of $K \cdot K_1$. That is, if $I_{1q}$ decreases and the polarity of the $I_e$ signal becomes negative, the frequency $\Delta f$ decreases and becomes zero.

It is seen from the above description that if the absolute value of $I_{1q}$ exceeds the limit value $I_{max}$, the frequency correction value $\Delta f$ increases, and if the absolute value of $I_{1q}$ becomes $I_{max}$ or less, the frequency correction value $\Delta f$ decreases.

Next, at the regenerative braking forward rotation deceleration state, if the absolute value $|I_{1q}|$ of $I_{1q}$ exceeds the limit value $I_{max}$, the deviation signal $I_e (=|I_{1q}|-I_{max})$ with the positive polarity is outputted from the subtractor 58. On the other hand, since the polarity of $I_{1q}$ becomes negative, the $-I_e$ signal is outputted from the signal selection circuit 62. Further, since the polarity of the $I_e$ signal is positive, outputs of both signal selection circuits 63, 64 are coincident with the $-I_e$ signal. The $-I_e$ signal is subjected to proportional integral calculation by the amplifier 65 and the integrator 66, and the frequency correction value $\Delta f$ obtained in the calculation is outputted from the adder 68. In this case, since the polarity of the $I_e$ signal is positive, the polarity of $\Delta f$ becomes negative, and as seen from FIG. 8(b), variation of the output frequency $f_1(=f_1^*-\Delta f)$ becomes gentle to the primary frequency command value $f_1^*$. As a result, the increase of $I_{1q}$ is suppressed.

Next, if $I_{1q}$ decreases and the polarity of the $I_e$ signal becomes negative, output of the signal selection circuit 63 becomes zero and output of the amplifier 65 also becomes zero. On the other hand, since the output of the signal selection circuit 63 becomes output of the scaler 67, the frequency correction value stored in the integrator 66 decreases with the time constant of $K \cdot K_1$. That is, it is seen that if $I_{1q}$ decreases and the polarity of the $I_e$ signal becomes negative, the absolute value of the frequency correction value $\Delta f$ decreases and becomes zero.

In similar manner, also at the power running reverse rotation acceleration state and the regenerative braking reverse rotation deceleration state, variation of the output frequency $f_1$ becomes gentle to the primary frequency command value $f_1^*$.

Next, as shown in FIG. 6, the primary voltage component command value $V_{1q}^*$ is outputted from the voltage component command calculation circuit 7. That is, if the output frequency $f_1$ in analog quantity outputted from the subtractor 6 through the input terminal 70 is converted into digital quantity by the A-D converter 71 and then inputted as address of the ROM 72 where values of $V_{1q}^*$ for $f_1$ are stored as function, the primary voltage component command value $V_{1q}^*$ in digital quantity is outputted. Subsequently, if the primary voltage component command value $V_{1q}^*$ in digital quantity is inputted to the D-A converter 73, it is converted into analog quantity and then outputted from the output terminal 74.

In this case, as shown in solid line in the block designated by numeral 72 in FIG. 6, in control system where amplitude of primary voltage, i.e., value of $V_{1q}$ is proportional to the output frequency $f_1$, as ratio of $V_{1q}$ to $f_1$ becomes constant, this control system is called V/F constant control system and is widely utilized as control system of the induction motor 2. It is also known well that if the value of V/F is controlled constant, amplitude of primary magnetic flux generated in the induction motor 2 can be controlled constant, not depending on the output frequency.

If the value of V/F is controlled constant, at the low speed rotating state, a problem occurs in that amplitude of primary magnetic flux in the induction motor 2 decreases due to the voltage drop by resistance of the primary winding and the generated torque decreases. In such a case, as shown in broken line in the block designated by numeral 72 in FIG. 6, method of setting the value of V/F large in the lower frequency region is generally used.

Next, as shown in FIG. 7, primary voltage commands $V_{1u}^*$, $V_{1v}^*$, $V_{1w}^*$ are outputted from the primary component command calculation circuit 8. That is, the primary voltage component command value $V_{1q}^*$ is inputted from the voltage component command calculation circuit 7 through the input terminal 75. On the other hand, if the output frequency $f_1$ is inputted from the subtractor 6 through the input terminal 76, digital values of $\sin\theta_1$ and $\cos\theta_1$ are outputted from the ROM 79 by similar operation to that of corresponding part in the current component calculation circuit 4 as above described.

If the primary voltage component command value $V_{1q}^*$ and digital values of $\sin\theta_1$ and $\cos\theta_1$ are inputted to the multiplication type D-A converters 80, 81 and subjected to multiplication and analog conversion, calculation of equation (5) is carried out and the component command values $V_{1\alpha}^*$, $V_{1\beta}^*$ in the $\alpha$-axis and the $\beta$-axis of the primary voltage are outputted. Subsequently calculation of equation (4) is carried out by the scalers 82, 83, 8, 87 and the subtractors 84, 86, and the primary voltage $V_{1u}^*$, $V_{1v}^*$, $V_{1w}^*$ are outputted from the output terminals 88-90 respectively.

Subsequently, if these primary voltage commands $V_{1u}^*$, $V_{1v}^*$, $V_{1w}^*$ are inputted to the power conversion circuit 1, control is carried out so that the actual values of the primary voltage applied to the induction motor 2 follow these primary voltage commands in similar operation to that of the prior art.

Next, the second embodiment of the present invention will be described.

Figure 9:
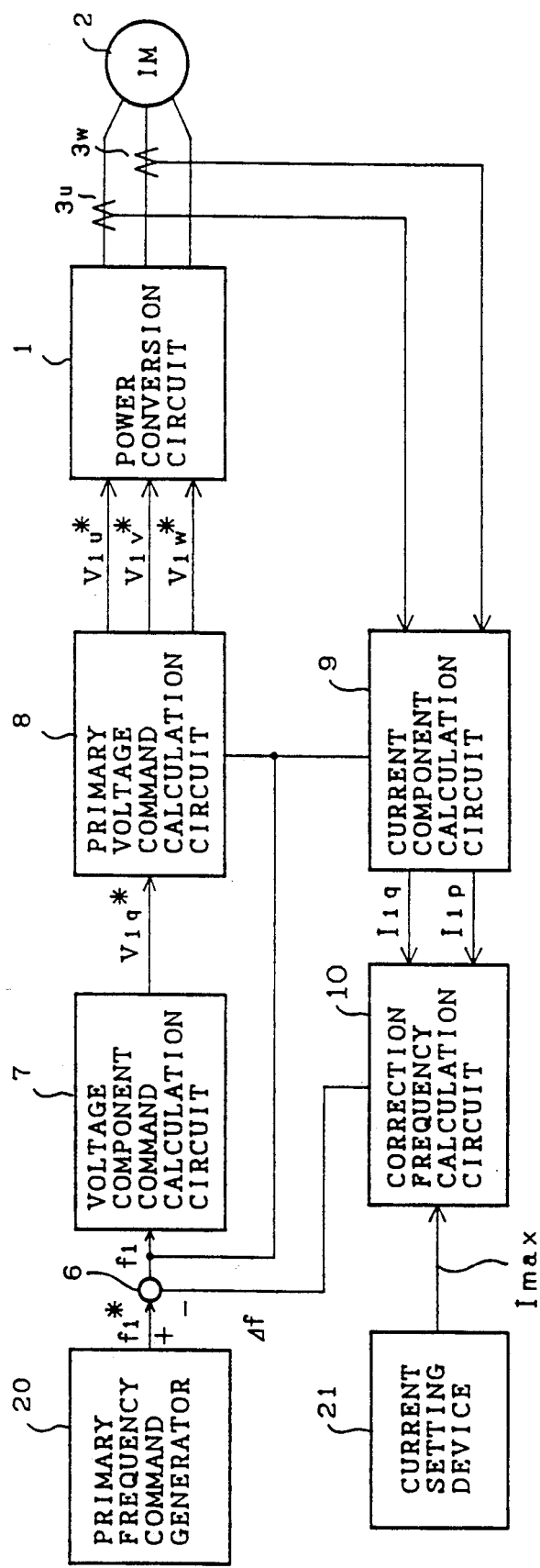
FIG. 9 is a block diagram showing a control device in a second embodiment of the invention.
Figure 10:
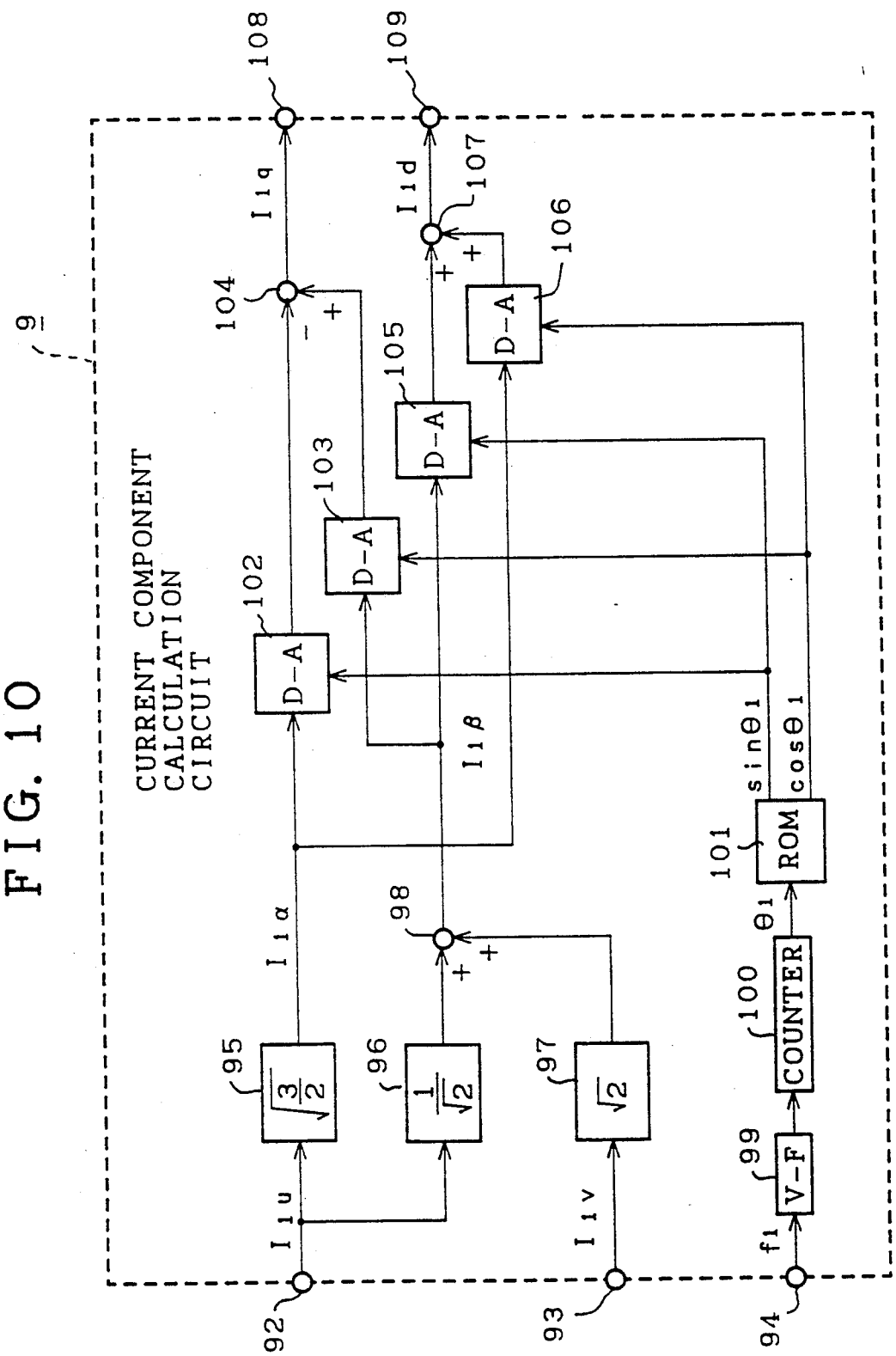
FIG. 10 is a block diagram showing constitution of a current component calculation circuit in FIG. 9.
Figure 11:
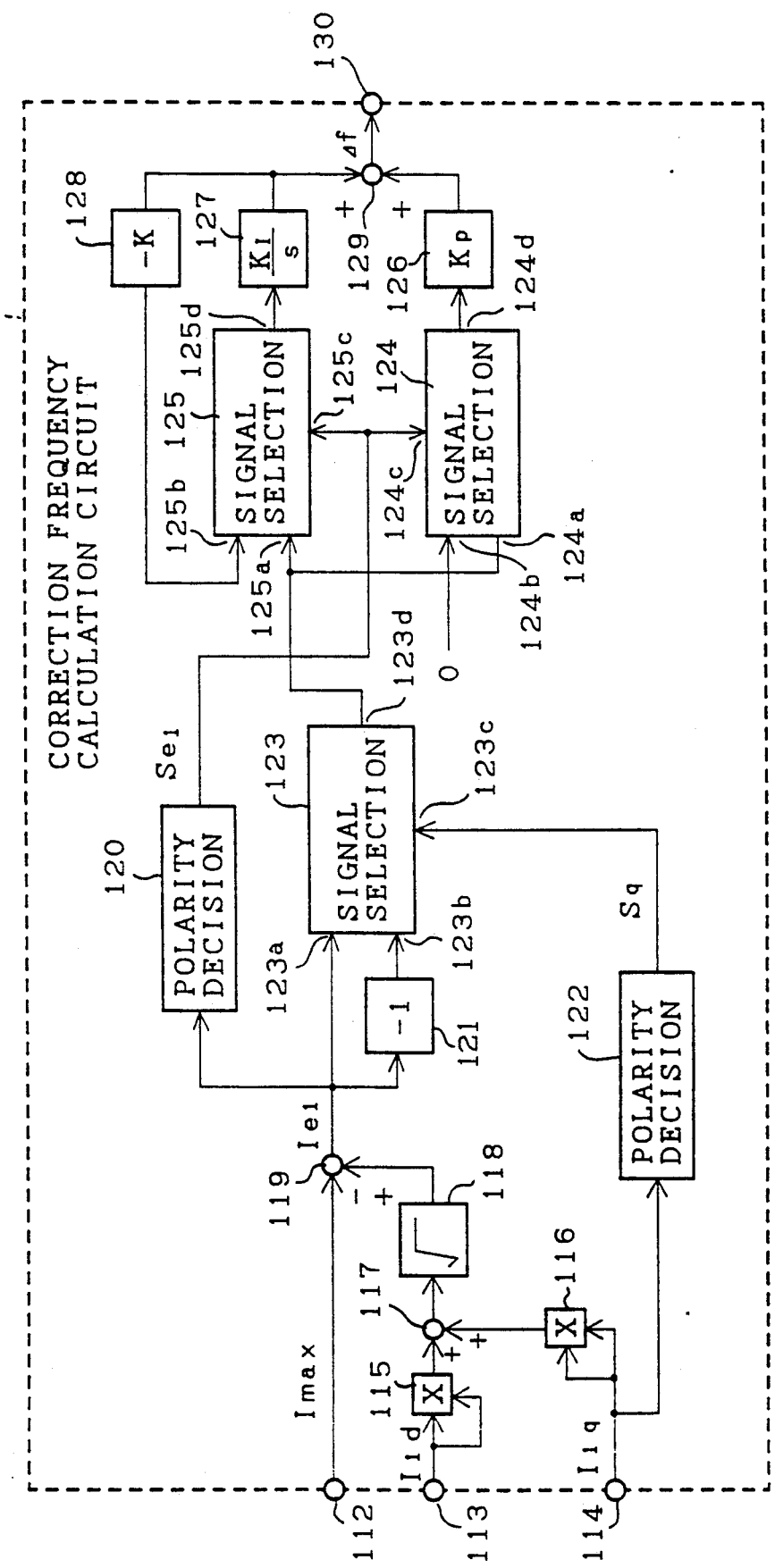
FIG. 11 is a block diagram showing constitution of a correction frequency calculation circuit in FIG. 9.

First, constitution of a control device according to the second embodiment referring to FIGS. 9-11. FIG. 9 is a block diagram showing the control device as a whole according to the second embodiment. In FIG. 9, numeral 9 designates a current component calculation circuit calculating first and second current components based on output frequency and primary current supplied to the induction motor 2, and numeral 10 designates a correction frequency calculation circuit connected to the current component calculation circuit 9 and a current setting device 21 for calculating frequency correction values.

FIG. 10 is a block diagram showing detailed constitution of the current component calculation circuit 9. As shown in FIG. 10, the current component calculation circuit 9 comprises input terminals 92, 93 connected to a current detector 3, an input terminal 94 connected to a subtractor 6, scalers 95-97, adders 98, 107, a V-F converter 99, a counter 100, a ROM 101, multiplication type D-A converters 102, 103, 105, 106, a subtractor 104, and output terminals 108 and 109 connected to the subtractor 104 and the adder 107 respectively.

Also FIG. 11 is a block diagram showing detailed constitution of a correction frequency calculation circuit 10. As shown in FIG. 11, the correction frequency calculation circuit 10 comprises an input terminal 112 connected to a current setting device 21, input terminals 113, 114 connected to the current component calculation circuit 9, multipliers 115, 116, adders 117, 129, a square root calculation circuit 118, a subtractor 119, polarity decision circuits 120, 122, scalers 121, 128, signal selection circuits 123-125, an amplifier 126, an integrator 127, and an output terminal 130 connected to the adder 129.

Next, operation of the control device according to the second embodiment will be described referring to FIGS. 10 and 11. As shown in FIG. 10, first and second current components, i.e., q-axis component $I_{1q}$ and d-axis component $I_{1d}$ of the primary current, are outputted from the current component calculation circuit 9. That is, if the primary currents $I_{1u}$ and $I_{1v}$ are inputted from the current setting device 3 through the input terminals 92 and 93 respectively, calculation of equation (2) is carried out by the scalers 95-97 and the adder 98, and the components $I_{1\alpha}$ and $I_{1\beta}$ in $\alpha$-axis and $\beta$-axis of the primary current are outputted from the scaler 95 and the adder 98 respectively.

On the other hand, if the output frequency $f_1$ in analog quantity outputted from the subtractor 6 is inputted through the input terminal 94 to the V-F converter 99, $\sin\theta_1$ and $\cos\theta_1$ are outputted from the ROM 101, in similar operation to that of the current component calculation circuit 4 in the first embodiment. Subsequently, if the $\alpha$-axis and $\beta$-axis components $I_{1\beta}$ and $I_{1\beta}$ of the primary current outputted respectively and $\cos\theta_1$ in digital quantity outputted from the ROM 101 are inputted to the multiplication type D-A converters 102, 103, 105, 106 and subjected to multiplication and analog conversion and then inputted to the subtractor 104 and adder 107, calculation of equation (3) is carried out and the first and second current components $I_{1q}$ and $I_{1d}$ are outputted from the output terminals 108 and 109 respectively.

Subsequently as shown in FIG. 11, the frequency correction value $\Delta f$ is outputted from the correction frequency calculation circuit 10. That is, if the first and second current components $I_{1q}$ and $I_{1d}$ are inputted from the current component calculation circuit 9 through the output terminals 113 and 114 and square values of respective current components are calculated by the multipliers 115 and 116 and the sum of the square values is calculated and then inputted to the square root calculation circuit 118, the root of the square sum of $I_{1q}$ and $I_{1d}$, i.e., the amplitude value $I_f$ of the primary current can be calculated.

Further, the deviation $I_{ef}(=I_1-I_{max})$ between the amplitude value $I_1$ of the primary current and the current limit value $I_{max}$ inputted from the current setting device 21 through the input terminal 112 can be calculated by the subtractor 119. Operation of other circuits is similar to that of the correction frequency calculation circuit 5 in the first embodiment shown in FIG. 5, except that in place of the $I_e$ signal, the $I_{ef}$ signal is used as deviation signal. Therefore the description shall be omitted.

Also in the control device shown in FIG. 9, operation of circuits other than the current component calculation circuit 9 and the correction frequency calculation circuit 10 is similar to that of corresponding circuits in the control device in the first embodiment. Therefore the description shall be omitted.

Figure 12:
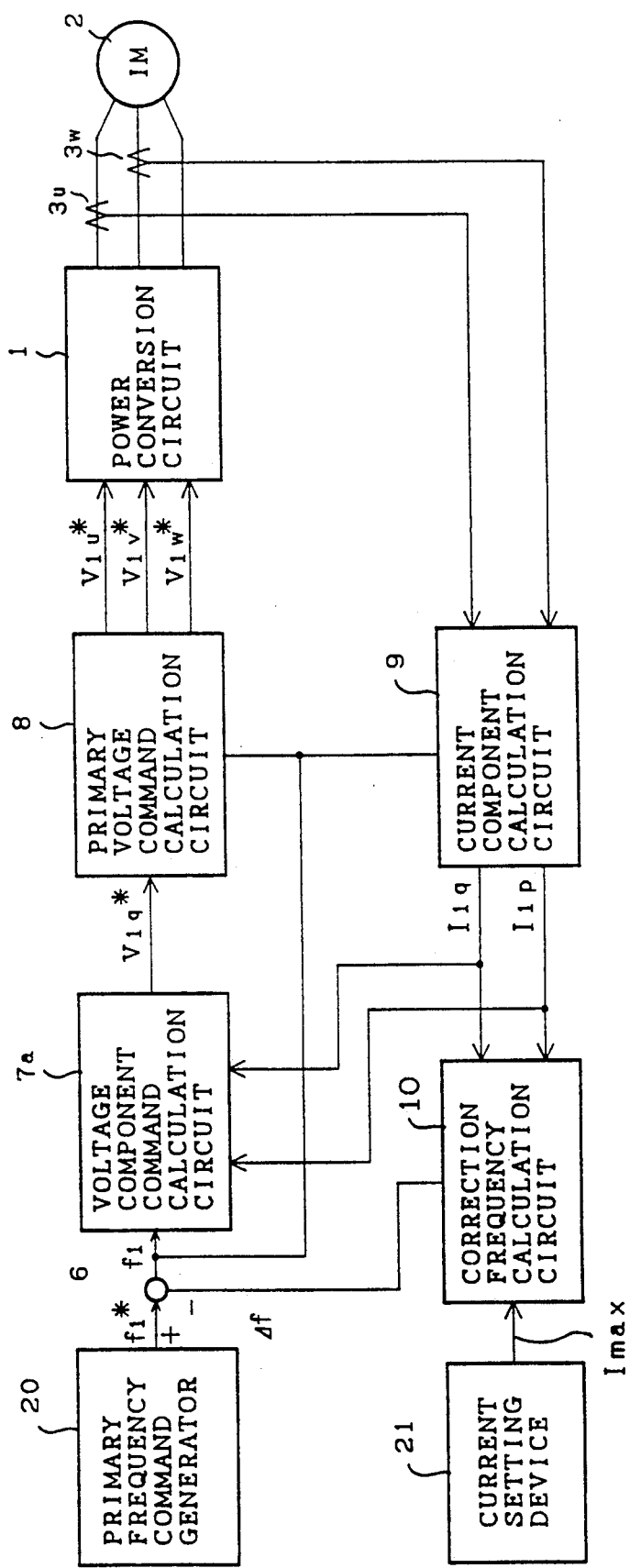
FIG. 12 is a block diagram showing a control device in another embodiment of the invention.

In the above embodiments, in the voltage component command calculation circuit, the value of V/F is set large in the lower frequency region, thereby the voltage drop due to the primary winding resistance $R_1$ is corrected, but constitution of the voltage component command calculation circuit may be made that shown in FIG. 12 thereby the voltage drop may be corrected using the d-axis and q-axis components $I_{1d}$, $I_{1q}$ of the primary current outputted from the current component calculation circuit 9.

Figure 13:
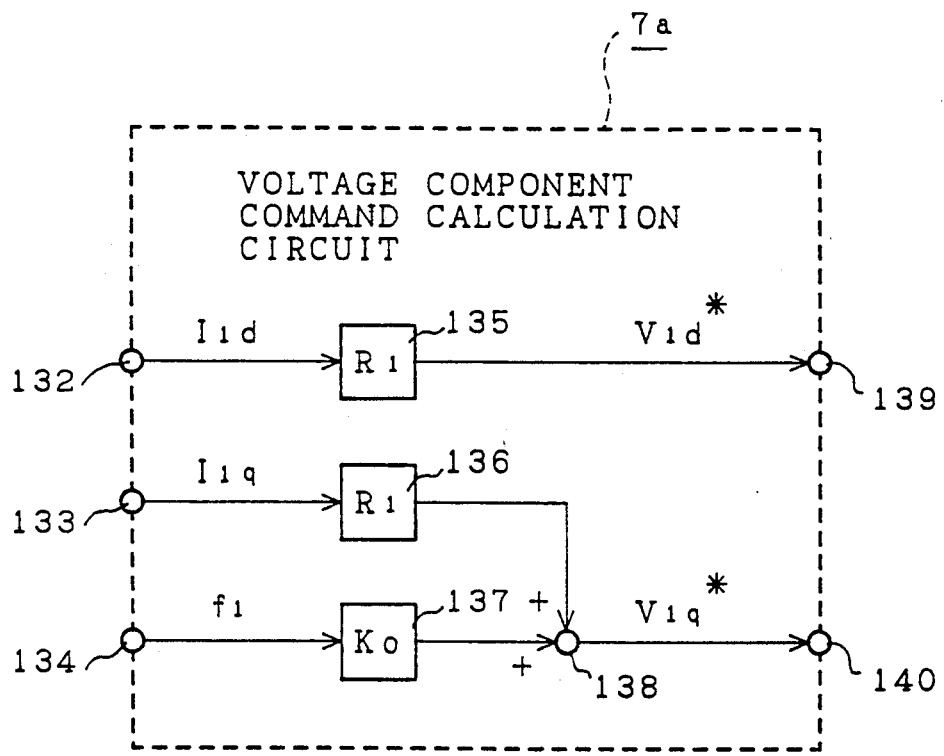
FIG. 13 is a block diagram showing constitution of a voltage component command calculation circuit in FIG. 12.

That is, in a voltage component command calculation circuit 7a in a block diagram shown in FIG. 13, if d-axis and q-axis components $I_{1d}$, $I_{1q}$ of primary current outputted from a current component calculation circuit 9 through input terminals 132, 133 respectively are inputted to scalers 13, 136 having coefficient values being equal to primary winding resistance $R_1$ of an induction motor 2 respectively, voltage drop values $R_1I_{1d}$, $R_1I_{1q}$ due to the primary winding resistance $R_1$ can be calculated. Subsequently, voltage drop value $R_1I_{1d}$ outputted from a scaler 13 is outputted as voltage component value $V_{1d}^*$ of d-axis from an output terminal 139.

On the other hand, if output frequency $f_1$ outputted from a subtractor 6 through an input terminal 134 is inputted to a scaler 137, q-axis voltage component command value at no-load state is calculated. The q-axis voltage component command value is added to the voltage drop value $R_1I_{1q}$ outputted from the scaler 136 by an adder 138, and then the added value is outputted as voltage component command value $V_{1q}^*$ of q-axis from an output terminal 140. Here, coefficient $K_0$ in the scaler 137 is set equal to V/F value at no-load state.

In this case, primary voltage commands $V_{1u}^*$, $V_{1v}^*$, $V_{1w}^*$ are calculated from these voltage component command values $V_{1d}^*$, $V_{1q}^*$ of d-axis and q-axis by calculation of equations (4) and (5) in the primary voltage command calculation circuit 8.

Further, in place of calculating the voltage drop values $R_1 I_{1d}$, $R_1 I_{1q}$ using $I_{1d}$, $I_{1q}$, any one or both of the voltage drop values may be previously set as a constant value.

As above described, in the present invention, q-axis component $I_{1q}$ of the primary current or both of d-axis and q-axis components $I_{1d}$, $I_{1q}$ are continuously calculated using output frequency and the primary current, and a frequency correction value is calculated based on an amplitude value of the primary current being the absolute value of $I_{1q}$ or root of the square sum of $I_{1d}$ and $I_{1q}$, and the frequency correction value is subtracted from the primary frequency command value inputted from the outside by a subtractor and a frequency as a result of the subtraction is used as output frequency thereby output voltage and frequency of the power conversion circuit are controlled. Accordingly, the current limiting operation can be carried out not only at the steady running state but also at the rapid acceleration/deceleration state, and the power conversion circuit can be protected from overcurrent. Also since information required for the control is only the primary current supplied to the induction motor, effect is in that the control circuit can be constituted at low cost.

What is claimed is:

1. A control device of an induction motor, comprising:
    a power conversion circuit for outputting alternating voltage with variable voltage and variable frequency to an induction motor;
    a current detector for detecting primary current supplied from said power conversion circuit to said induction motor;
    a correction frequency calculation circuit for detection polarity of a first current component, and calculating a frequency correction value using a current limit value previously set, the first current component, and the detected polarity of the first current component;
    a subtractor for subtracting the frequency correction value from a primary frequency command value and making the subtracted value to be an output frequency;
    a voltage component command calculation circuit for calculating a primary voltage component command value from output of said subtractor according to function relation previously set;
    a primary voltage command calculation circuit for calculating a primary voltage command value of said induction motor from the output of said subtractor and the primary voltage component command value and for outputting the primary voltage command value to said power conversion circuit; and
    a current component calculation circuit for calculating a current component with the same phase as that of the primary command value and for outputting the current component as the first current component, using primary current detected by said current detector and output of said subtractor.

2. A control device of an induction motor as set forth in claim 1, said correction frequency calculation circuit comprising:
    a polarity decision circuit for deciding whether said induction motor is at power running state or regenerative braking state from the polarity of the first current component; and
    a correction value generating section for outputting a positive correction value at the power running state and outputting a negative frequency correction value at the regenerative braking state.

3. A control device of an induction motor as set forth in claim 2, said correction value generating section comprising:
    a first signal selection circuit for selecting a deviation signal subtracting the current limit value from absolute value of the first current component at the power running state, and for selecting a sign conversion value of the deviation signal at the regenerative braking state;
    a second signal selection circuit for selecting output of said first signal selection circuit when the polarity of the deviation signal is positive, and for selecting zero level when the polarity of the deviation signal is negative;
    a third signal selection circuit for selecting output of said first signal selection circuit when the polarity of the deviation signal is positive, and for selecting a feedback signal when the polarity of the deviation signal is negative;
    an amplifier for amplifying an output signal of said second signal selection circuit;
    an integrator for integrating an output signal of said third signal selection circuit;
    a scaler for multiplying output of said integrator by a negative coefficient and making the multiplied value to be a feedback signal; and
    an adder for adding output of said integrator to output of said amplifier and making the added value to be a frequency correction value.

4. A control device of an induction motor as set forth in claim 1,
    wherein said voltage component command calculation circuit comprises a frequency-voltage conversion section for outputting a value proportional to an output frequency being output of said subtractor as a primary voltage component command value.

5. A control device of an induction motor as set forth in claim 1, said primary voltage command calculation circuit comprising:
    an angle output section for outputting angle $\theta_1$ being a time integral value of the first current component;
    an orthogonal component output section for calculating orthogonal coordinate components of voltage using the primary voltage component value and the angle $\theta_1$; and
    a primary voltage command generating section for calculating a three-phase primary voltage command from the coordinate components.

6. A control device of an induction motor as set forth in claim 1, said current component calculation circuit comprising:
    an angle output section for outputting angle $\theta_1$ being a time integral value of the first current component;
    an orthogonal component calculation section for calculating orthogonal coordinate components from primary current detected by the current detector; and a first current component generating section for calculating q-axis component in rotational coordinates of current using the orthogonal components and the angle $\theta_1$.

7. A control device of an induction motor, comprising:

a power conversion circuit for outputting alternating voltage with variable voltage and variable frequency to an induction motor;

a current detector for detecting primary current supplied from said power conversion circuit to said induction motor;

a correction frequency calculation circuit for detecting polarities of a first current component and a second current component, and calculating a frequency correction value using a current limit value previously set, the first current component, the second current component, and the detected polarities of the first and second current components;

a subtractor for subtracting the frequency correction value from a primary frequency command value and making the subtracted value to be an output frequency;

a voltage component command calculation circuit for calculating a primary voltage component command value from output of said subtractor according to function relation previously set;

a primary voltage command calculation circuit for calculating a primary voltage command value of said induction motor from the output of said subtractor and the primary voltage component command value, and for outputting the primary voltage command value to said power conversion circuit; and a current component calculation circuit for calculating a current component with the same phase as that of the primary voltage command value and a current component with a phase shifted by 90 degrees therefrom for outputting the current components as the first and second current components, using primary current detected by said current detector and output of said subtractor.

8. A control device of an induction motor as set forth in claim 7, said correction frequency calculation circuit comprising:

a polarity decision circuit for deciding whether said induction motor is at power running state or regenerative braking state from the polarity of the first current component; and a correction value generating section for outputting a positive correction value at the power running state and outputting a negative frequency correction value at the regenerative braking state.

9. A control device of an induction motor as set forth in claim 8, said correction value generating section comprising:

an amplitude value output section for calculating an amplitude value of primary current by calculating root of sum of square value of the first current component and square value of the second current component;

a first signal selection circuit for selecting a deviation signal subtracting the current limit value from amplitude value of the primary current at the power running state, and for selecting a signal conversion value of the deviation signal at the regenerative braking state;

a second signal selection circuit for selecting output of said first signal selection circuit when the polarity of the deviation signal is positive, and for selecting zero level when the polarity of the deviation signal is negative;

a third signal selection circuit for selecting output of said first signal selection circuit when the polarity of the deviation signal is positive, and for selecting a feedback signal when the polarity of the deviation signal is negative;

an amplifier for amplifying an output signal of said second signal selection circuit;

an integrator for integrating an output signal of said third signal selection circuit;

a scaler for multiplying output of said integrator by a negative coefficient and making the multiplied value to be a feedback signal; and an adder for adding output of said integrator to output of said amplifier and making the added value to be a frequency correction value.

10. A control device of an induction motor as set forth in claim 7, wherein said voltage component command calculation circuit comprises a frequency-voltage conversion section for outputting a value proportional to an output frequency being output of said subtractor as a primary voltage component command value.

11. A control device of an induction motor as set forth in claim 7, said current component command calculation circuit comprising:

a first scaler for calculating d-axis component of voltage component command value by multiplying d-axis component of primary current by a primary winding resistance value of the induction motor;

a second scaler for multiplying q-axis component of primary current by a primary winding resistance value of the induction motor;

a third scaler for calculating q-axis component of a voltage component command value at no-load state from the output frequency;

an adder for calculating sum of output of said second scaler and output of said third scaler and outputting the sum value as q-axis component of the voltage component command value; and said primary voltage command calculation circuit calculating the primary voltage command value using d-axis component and q-axis component of the voltage component command value.

12. A control device of an induction motor as set forth in claim 7, said primary voltage command calculation circuit comprising:

an angle output section for outputting angle $\theta_1$ being a time integral value of the first current component;

an orthogonal component output section for calculating orthogonal coordinate components of voltage using the primary voltage component command value and the angle $\theta_1$; and a primary voltage command generating section for calculating a three-phase primary voltage command from the coordinate components.

13. A control device of an induction motor as set forth in claim 7, said current component calculation circuit comprising:

an angle output section for outputting angle $\theta_1$ being a time integral value of the first current component;

an orthogonal component calculation section for calculating orthogonal coordinate components from primary current detected by the current detector; and a current component generating section for calculating d-axis component and q-axis component in rotational coordinates of current using the orthogonal components and the angle $\theta_1$.

* * * * *